United States Patent [19]
Green

[11] Patent Number: 6,076,381
[45] Date of Patent: Jun. 20, 2000

[54] BICYCLE LOCKING SYSTEM

[76] Inventor: Thomas Norris Green, 45 NE. 6th Ave., Apt. 7, Delray Beach, Fla. 33483

[21] Appl. No.: 09/270,243

[22] Filed: Mar. 15, 1999

[51] Int. Cl.[7] .................................................. B60R 25/02
[52] U.S. Cl. .............................................. 70/186; 70/233
[58] Field of Search ............................ 70/186, 233, 252, 70/182–185

[56] References Cited

U.S. PATENT DOCUMENTS

| 1,078,105 | 11/1913 | McNab et al. | |
| 1,462,137 | 7/1923 | Hill | 70/185 |
| 1,486,273 | 3/1924 | Allison | 70/312 |
| 1,976,724 | 10/1934 | Hays | 70/186 |
| 2,017,494 | 10/1935 | Greenberg et al. | 70/185 |
| 2,143,502 | 1/1939 | Taman | 70/233 |
| 2,231,546 | 2/1941 | Neiman | 70/233 |
| 2,500,593 | 3/1950 | Wilson | 70/252 |
| 3,781,861 | 12/1973 | Adler, Jr. et al. | 70/233 X |
| 3,863,472 | 2/1975 | Klingfus | 70/186 |
| 4,055,060 | 10/1977 | Bellino | 70/234 |
| 5,353,663 | 10/1994 | Samuelson | 70/233 X |

FOREIGN PATENT DOCUMENTS

| 524046 | 5/1921 | France | 70/185 |
| 673199 | 1/1930 | France | 70/186 |
| 780635 | 4/1935 | France | 70/186 |
| 841012 | 5/1939 | France | 70/185 |
| 874061 | 7/1942 | France | 70/186 |
| 1158662 | 6/1958 | France | 70/184 |
| 143357 | 11/1935 | Germany | 70/252 |
| 266060 | 7/1929 | Italy | 70/185 |
| 0240449 | 10/1988 | Japan | 70/252 |
| 5642 | 1/1921 | Netherlands | 70/186 |
| 253851 | 11/1948 | Switzerland | 70/186 |
| 158298 | 2/1921 | United Kingdom | 70/186 |
| 750405 | 6/1956 | United Kingdom | 70/186 |
| 1149754 | 4/1969 | United Kingdom | 70/252 |

*Primary Examiner*—Lloyd A. Gall

[57] ABSTRACT

Disclosed is a novel bicycle locking system for bicycles of all makes which embodies a conventional key and tumbler arrangement coupled to a cam and locking pin. The locking assembly of the system is installed on the steering column of the bicycle's frame and becomes an integral part of the bicycle. When in the locked position, the locking assembly renders the bicycle unrideable by virtually locking the steering wheel in a zero degree or forty-five degree angle. The locking assembly includes a first locking component with a semi-cylindrical surface positionable around the frame of a bicycle at an elevation adjacent to the elevation of an aperture therethrough. The assembly includes a second locking component with a semi-cylindrical surface positionable around the frame in mating contact with the first locking component to form a cylindrical component around the frame. The intermediate component has a radial aperture positioned in alignment with the aperture of the frame. The second locking component is provided with a recess and a lock, the recess with a locking pin movable from a withdrawn inoperative orientation wherein the pin extends through the aperture and one of the apertures of the drive shaft.

2 Claims, 3 Drawing Sheets

BICYCLE LOCKING SYSTEM

BACKGROUND OF THE INVENTION

1. Field of the Invention

The present invention relates to a bicycle locking system and more particularly pertains to preventing unauthorized usage or theft of a bicycle through the locking of the steering components.

2. Description of the Prior Art

The use of bicycle locks of known designs and configurations is known in the prior art. More specifically, bicycle locks of known designs and configurations heretofore devised and utilized for the purpose of preventing unauthorized usage or theft of bicycles through known methods and apparatuses are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 4,509,349 to Partridge, issued Apr. 9, 1985, discloses a bicycle with key-operated locking mechanism. U.S. Pat. No. 4,232,537 to Plaiss, issued Nov. 11, 1980, discloses a wheeled vehicle lock. U.S. Pat. No. 2,204,908 to Olson, issued Jun. 18, 1940, discloses a bicycle lock. U.S. Pat. No. 1,998,512 to Manton, issued Apr. 23, 1935 discloses a bicycle lock. Lastly, International Patent Number WO 83/10761 to Saarnivaara, issued May 26, 1983 discloses a locking means for bicycle.

While these devices fulfill their respective, particular objectives and requirements, the aforementioned patents do not describe bicycle locking system which embodies a conventional key and tumbler arrangement coupled to a cam and locking pin. Locking devices for bicycles such as chains, steel cables and locks are commonly used for security These are easily cut with bolt cutters and hack saws, and are clumsy and unwieldy to employ. The structure of the present invention obviates these weaknesses by providing a fixed and permanent locking device that cannot be lost or cut off.

In this respect, the bicycle locking system according to the present invention substantially departs from the conventional concepts and designs of the prior art, and in doing so provides an apparatus primarily developed for the purpose of preventing unauthorized usage or theft of a bicycle through the locking of the steering components.

Therefore, it can be appreciated that there exists a continuing need for a new and improved bicycle locking system which can be used for preventing unauthorized usage or theft of a bicycle through the locking of the steering components. In this regard, the present invention substantially fulfills this need.

SUMMARY OF THE INVENTION

In view of the foregoing disadvantages inherent in the known types of bicycle locks of known designs and configurations now present in the prior art, the present invention provides an improved bicycle locking system. As such, the general purpose of the present invention, which will be described subsequently in greater detail, is to provide a new and improved bicycle locking system and method which has all the advantages of the prior art and none of the disadvantages.

To attain this, the present invention essentially comprises a new and improved bicycle locking system designed to prevent unauthorized usage or theft through the locking of the steering components. A bicycle is provided having a frame including a hollow tubular portion adjacent the front thereof with a cylindrical interior surface and a cylindrical exterior surface and at least one aperture extending therethrough. A drive shaft in a cylindrical configuration is rotatably mounted within the frame with an upper end having steering mechanisms and the lower end having a front wheel rotatable for directional purposes The drive shaft has an exterior surface located within the interior surface of the frame with two radial apertures extending therethrough of a diameter essentially equal to the diameter of the aperture in the frame. One of the apertures of the drive shaft is alignable with the aperture of the frame when the wheel is in a forward orientation and the other is alignable with the aperture in the frame when the wheel is turned ninety degrees An interior locking component with a semi-cylindrical surface is positioned around the frame at an elevation adjacent to the elevation of the aperture therethrough An intermediate locking component with a semi-cylindrical surface is positioned around the frame in mating contact with the interior locking component to form a cylindrical component around the frame. The intermediate component has a radial aperture positioned in alignment with the aperture of the frame. An exterior locking component is positionable adjacent to the intermediate locking component, the exterior locking component having a recess. Lastly, a lock is located within the recess with a locking pin movable from a withdrawn inoperative orientation wherein the bicycle may be ridden normally and an extended orientation wherein the pin extends through the aperture and one of the apertures of the drive shaft. The lock also has a locking cylinder with an exposed face with an-aperture for receiving a locking key, the opposed face of the locking component adapted to be pressed inwardly to depress the pin into a locking orientation with respect to the drive shaft but to withdraw upon the insertion of the key with a spring urging the locking component to a withdrawn unlocked orientation.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention,. It is important, therefore, that the claims be regarded as including such equivalent constructions insofar as they do not depart from the spirit and scope of the present invention It It is therefore an object of the present invention to provide a new and improved bicycle locking system which has all of the advantages of the prior art bicycle locks of known designs and configurations and none of the disadvantages.

It is another object of the present invention to provide a new and improved bicycle locking system which may be easily and efficiently manufactured and marketed.

It is further object of the present invention to provide a new and improved bicycle locking system which is of durable and reliable constructions.

An even further object of the present invention is to provide a new and improved bicycle locking system which is susceptible of a low cost of manufacture with regard to both materials and labor, and which accordingly is then susceptible of low prices of sale to the consuming public, thereby making such bicycle locking system economically available to the buying public.

Even still another object of the present invention is to provide a bicycle locking system for preventing unauthorized usage or theft of a bicycle through the locking of the steering components.

Lastly, it is an object of the present invention to provide a new and improved bicycle locking system comprising a first locking component with a semi-cylindrical surface positionable around the frame of a bicycle at an elevation adjacent to the elevation of an aperture therethrough, a second locking component with a semi-cylindrical surface positionable around the frame in mating contact with the first locking component to form a cylindrical component around the frame, the intermediate component having a radial aperture positioned in alignment with the aperture of the frame, the second locking component having a recess and a lock, the recess with a locking pin movable from a withdrawn inoperative orientation wherein the pin extends through the aperture and one of the apertures of the drive shaft.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
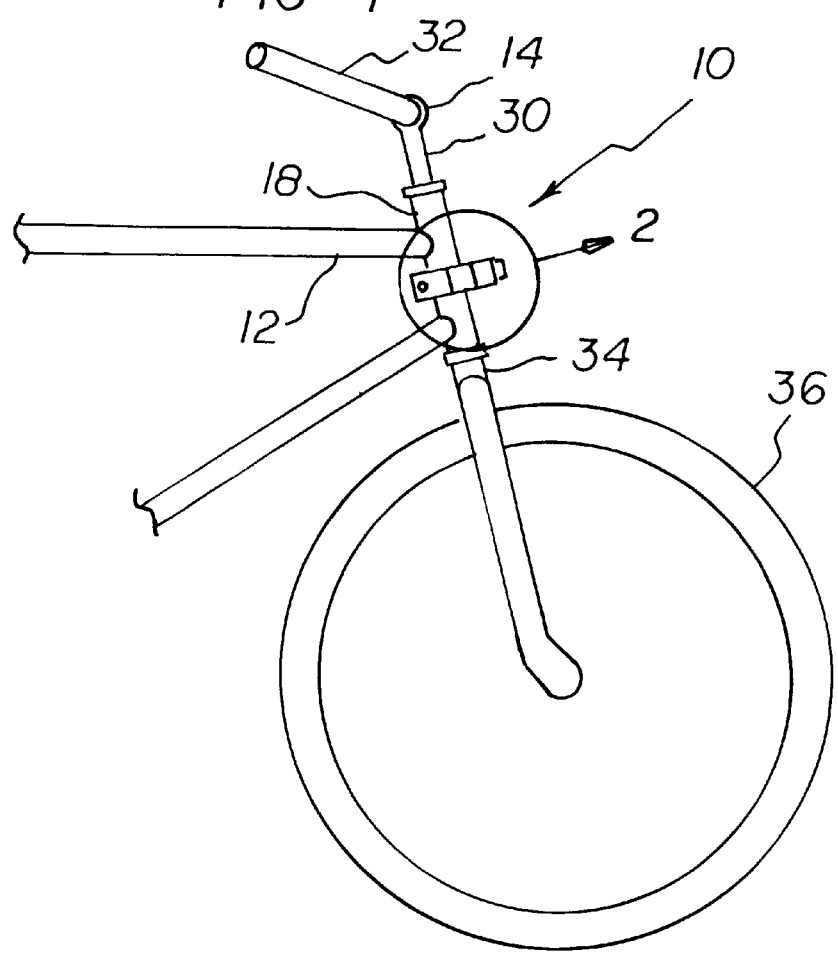
FIG. 1 is a side elevational view of the new and improved bicycle locking system constructed in accordance with the principle of the present invention.
Figure 2:
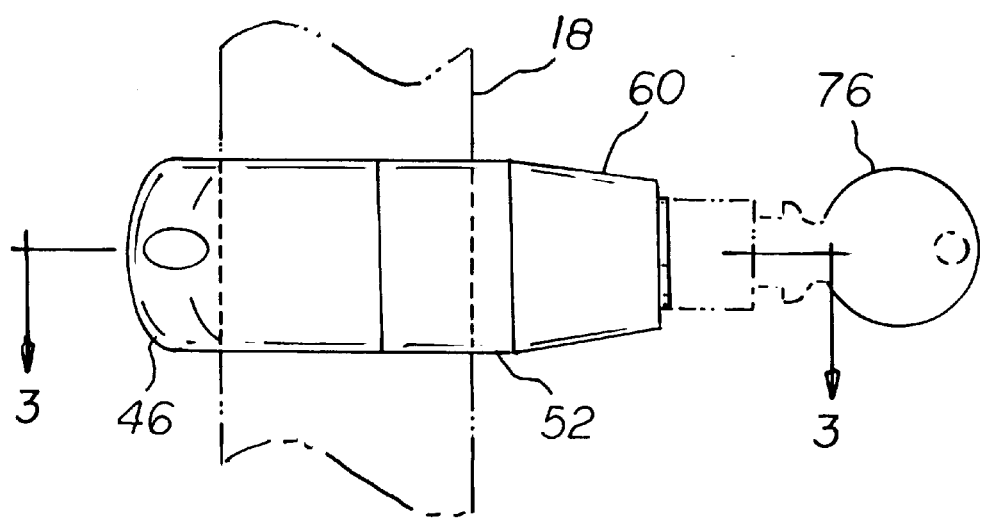
FIG. 2 is an enlarged side elevational view taken at circle 2 of FIG. 1.
Figure 3:
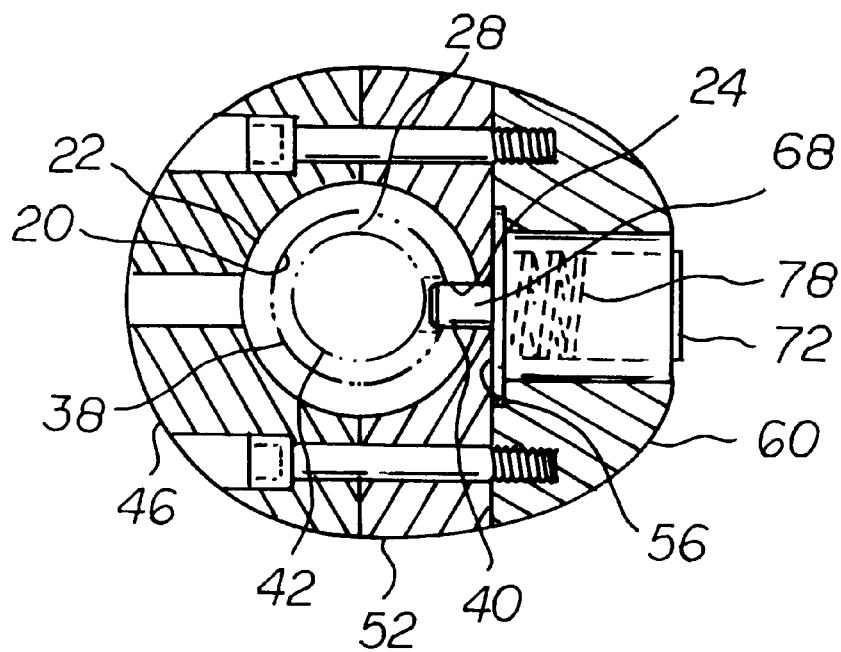
FIG. 3 is a cross-sectional view taken along line 3—3 of FIG. 2.
Figure 4:
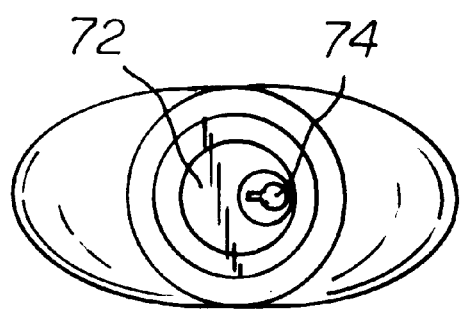
FIG. 4 is an end elevational view of the lock of the prior figure.
Figure 5:
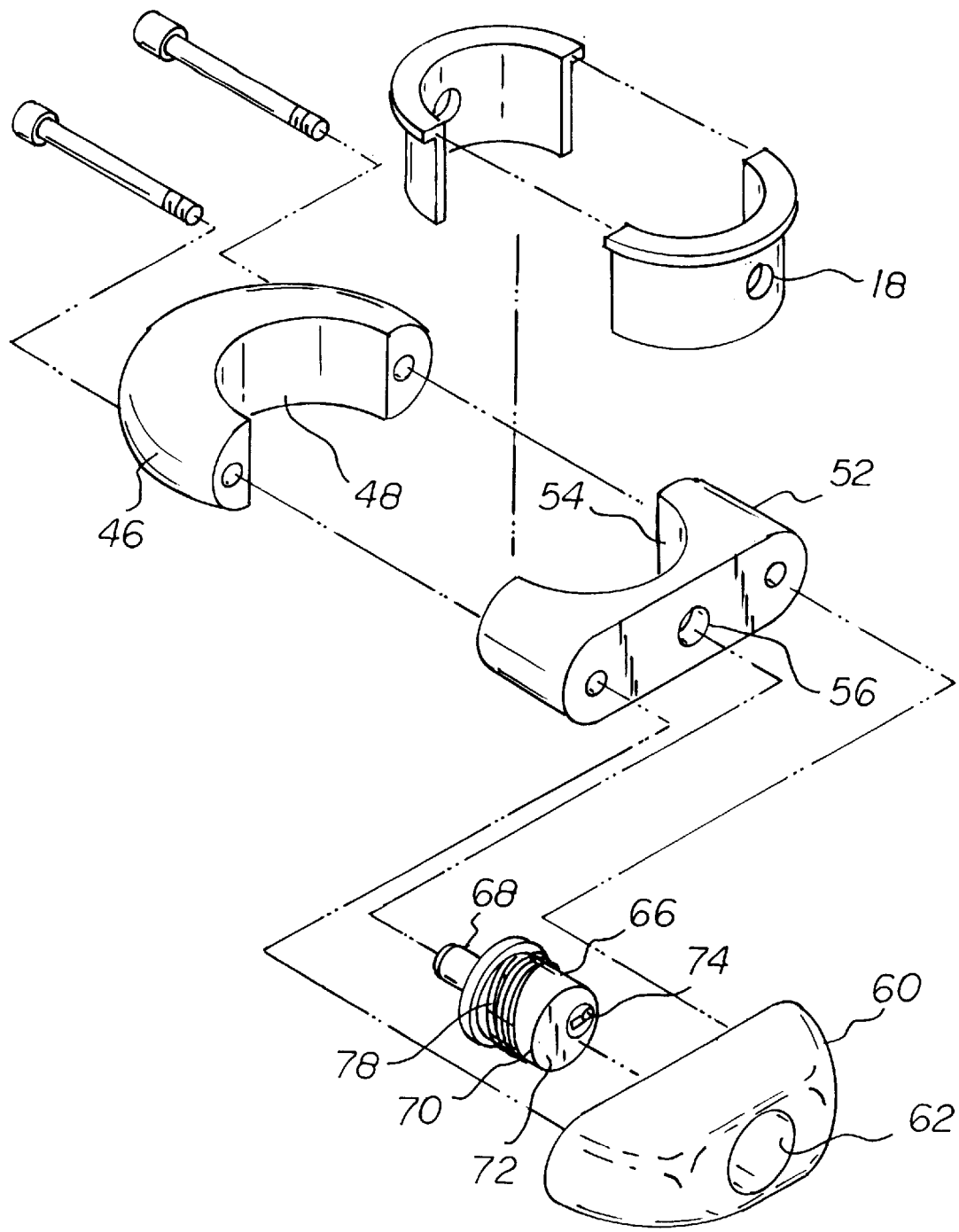
FIG. 5 is exploded perspective view of the components of the lock shown in the prior Figures.

With reference now to the drawings, and in particular to FIG. 1 thereof, the preferred embodiment of the new and improved bicycle locking system embodying the principles and concepts of the present invention and generally designated by the reference numeral 10 will be described The present invention, the bicycle locking system 10, is comprised of a plurality of components. Such components in their broadest context include a bicycle, a drive shaft, an interior locking component, an intermediate locking component, an exterior locking component and a lock. Such components are individually configured and correlated with respect to each other so as to attain the desired objective.

The first component of the present invention is a bicycle 14. The bicycle includes a frame 12 with a hollow tubular portion 18 adjacent the front thereof. The tubular portion of the front portion of the frame has a cylindrical interior surface 20 and a cylindrical exterior surface 22. At least one aperture 24 extends through the cylindrical interior and exterior surfaces of the hollow tubular portion.

Next provided as a component of the present invention is a drive shaft 28. The drive shaft is formed of a cylindrical configuration rotatably mounted within the frame. The drive shaft has an upper end 30 having steering mechanisms 32. The drive shaft also has a lower end 34 having a front wheel 36 rotatable for directional purposes. The drive shaft is further provided with an exterior surface 38 located within the interior surface of the frame with two radial apertures 40,42 extending therethrough. The two radial apertures are formed of a diameter essentially equal to the diameter of the aperture in the frame. One of the apertures of the drive shaft is alignable with the aperture of the frame when the wheel is in a forward orientation and the other is alignable with the aperture in the frame when the wheel is turned ninety degrees.

The next component of the present invention is an interior locking component 46. The interior locking component has a semi-cylindrical surface 48 positionable around the frame at an elevation adjacent to the elevation of the aperture therethrough.

Further provided as a component of the present invention is an intermediate locking component 52. The intermediate locking component has a semi-cylindrical surface 54 positioned around the frame in mating contact with the interior locking component. This mating relationship forms a cylindrical component around the frame, the intermediate component having a radial aperture 56 positioned in alignment with the aperture of the frame.

Next provided is an exterior locking component 60. The exterior locking component is positionable adjacent to the intermediate locking component, the exterior locking component having a recess 62.

Lastly provided as a component of the present invention is a lock 66. The lock is located within the recess with a locking pin 68 movable from a withdrawn inoperative orientation wherein the bicycle may be ridden normally. The locking pin is also movable into an extended orientation wherein the pin extends through the aperture and one of the apertures of the drive shaft. The lock also has a locking cylinder 70 with an exposed face 72 with an aperture 74 for receiving a locking key 76. The opposed face of the locking component is adapted to be pressed inwardly to depress the pin into a locking orientation with respect to the drive shaft but to withdraw upon the insertion of the key with a spring 78 urging the locking component to a withdrawn unlocked orientation.

The present invention is a novel locking device for bicycles of all makes which embodies a conventional key and tumbler arrangement coupled to a cam and locking pin.

It is installed on the steering column of the bicycle's frame and becomes an integral part of the bicycle, which when in the locked position renders the bicycle unrideable by virtually locking the steering column in a zero degree or forty-five degree angle.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and de-scribed, and accordingly, all suitable modifications and equivalents may be resorted to, falling within the scope of the invention.

What is claimed as being new and desired to be protected by Letters Patent of the United States is as follows:

1. A locking system for a bicycle having steering components to prevent unauthorized usage or theft of the bicycle through the locking of the steering components comprising, in combination:
    a bicycle having a frame including a hollow tubular portion adjacent the front thereof with a cylindrical interior surface and a cylindrical exterior surface and at least one aperture extending therethrough;
    a drive shaft in a cylindrical configuration rotatably mounted within the frame with an upper end having steering mechanisms and the lower end having a front wheel rotatable for directional purposes, the drive shaft having an exterior surface located within the interior surface of the frame with two radial apertures extending therethrough of a diameter essentially equal to the diameter of the aperture in the frame, one of the apertures of the drive shaft being alignable with the aperture of the frame when the wheel is in a forward orientation and the other being alignable with the aperture in the frame when the wheel is turned ninety degrees;
    a separate interior locking component with a semi-cylindrical surface positionable around the frame at an elevation adjacent to the elevation of the aperture therethrough;
    a separate intermediate locking component with a semi-cylindrical surface positioned around the frame in mating contact with the interior locking component whereby the semi-cylindrical surfaces of the interior locking component and the intermediate locking component form a cylindrical component around the frame, the intermediate component having a radial aperture positioned in alignment with the aperture of the frame;
    a separate exterior locking component positionable adjacent to the intermediate locking component, the exterior locking component having a recess; said exterior locking component including outer wall surfaces which are substantially flush with outer wall surfaces of the intermediate locking component threaded fasteners extending into each of said interior locking component, said intermediate locking component, and said exterior locking component, for coupling said components together; and
    a lock located within the recess with a locking pin movable from a withdrawn inoperative orientation wherein the bicycle may be ridden normally and an extended orientation wherein the pin extends through the radial aperture of the intermediate component and one of the apertures of the drive shaft, the lock also having a locking cylinder with an exposed face with an aperture for receiving a locking key, the opposed face of the lock adapted to be pressed inwardly to depress the pin into a locking orientation with respect to the drive shaft but to withdraw upon the insertion of the key with a spring urging the lock to a withdrawn unlocked orientation.

2. A bicycle locking system comprising:
    a separate interior locking component with a semi-cylindrical surface positionable around the frame of a bicycle, the frame having an aperture therethrough, the interior locking component having positionable at an elevation adjacent to the elevation of the aperture, a separate intermediate locking component with a semi-cylindrical surface positionable around the frame in mating contact with the first locking component whereby the semi-cylindrical surfaces of the interior locking a componets and the intermediate locking component form a cylindrical component around the frame, the intermediate component having a radial aperture adapted to be positioned in alignment with the aperture of the frame, a separate exterior locking component having a recess and a lock within the recess and with a movable locking pin formed as Part of the lock, said exterior locking component including outer wall surfaces which are substantially flush with outer wall surfaces of the intermediate locking component the locking pin movable between a withdrawn unlocked orientation and an advanced locked orientation wherein the locking pin extends through the radial aperture of the intermediate component and the aperture of the frame, and threaded fasteners extending into each of said interior locking component, said intermediate locking component, and said exterior locking component, for coupling said components together, wherein the lock includes a locking cylinder with an exposed face with an aperture for receiving a locking key, wherein the exposed face of the locking cylinder is adapted to be pressed inwardly to depress the pin into a locking orientation with respect to the frame but to withdraw upon the insertion of the key with a spring urging the locking cylinder to a withdrawn unlocked orientation.

\* \* \* \* \*